No. 809,370. PATENTED JAN. 9, 1906.
R. GUILLEAUME.
SADDLE TREE OR FRAME.
APPLICATION FILED SEPT. 16, 1904.
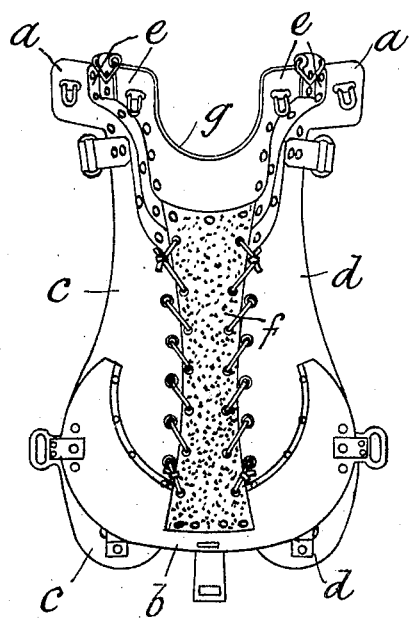
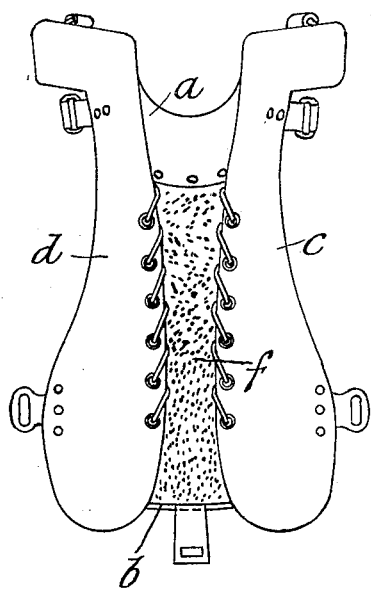
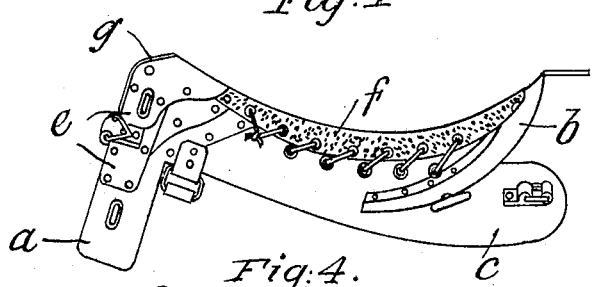

UNITED STATES PATENT OFFICE.

RUDOLF GUILLEAUME, OF MÜLHEIM-ON-THE-RHINE, GERMANY, ASSIGNOR TO MASCHINEN UND DAMPFKESSELFABRIK "GUILLEAUME WERKE" GESELLSCHAFT MIT BESCHRÄNKTER HAFTUNG, OF NEUSTADT-ON-THE-HARDT, GERMANY.

SADDLE TREE OR FRAME.

No. 809,370.     Specification of Letters Patent.     Patented Jan. 9, 1906.

Application filed September 16, 1904. Serial No. 224,680.

*To all whom it may concern:*

Be it known that I, RUDOLF GUILLEAUME, a subject of the Emperor of Germany, residing at Mülheim-on-the-Rhine, in the Empire of Germany, have invented new and useful Improvements in Saddle Trees or Frames, of which the following is a specification.

The object of the present invention is an improvement in saddle trees or frames made of steel; and it consists in the substitution for the narrow steel bars or strips heretofore employed of wide and suitably shaped, bent, and curved steel plates, whereby the saddle containing such tree or frame becomes very elastic and flexible and adapts itself longitudinally, transversely, and diagonally to the varying bodily shape of the horse, so that the rider has a complete mastery over the animal and the latter is not galled or wounded by the improved saddle tree or frame, as would be the case with a saddle tree or frame made, as heretofore, of narrow steel bars or strips.

The invention is illustrated in the accompanying drawings, in which—

Figure 1 is a side view, Fig. 2 a top view, Fig. 3 an under side view, and Fig. 4 a sectional detail view, of a saddle tree or frame constructed according to the invention.

The improved saddletree has two longitudinal plates $c\ d$, connected together by cross-plates $a\ b$ on the front and on the back part of the frame—that is to say, by pommel and cantle plates. The side plates $c\ d$ are made of sheet-steel and are formed at their forward ends with sideway extensions which are bent downward. Adjoining these extensions such plates are comparatively narrow, but gradually widen out toward the rear part, where they are rounded off in shape. The front cross-plate or pommel-plate $a$ is formed at its ends with sidewardly and downwardly projecting portions to fit against the front ends of the side plates, and the intermediate part is so shaped and curved upward and backward that the heaviest pressure will not be capable of bending it to such an extent that it will touch the animal's backbone. The back plate or cantle-plate $b$ is somewhat in the form of a crescent. It is riveted to the side plates around its inner curve and is curved upward and backward from its connections with the side plates, such connections being somewhat forward of the rear ends of the side plates. The side plates $c\ d$ and front and back plates $a\ b$ are riveted together over somewhat-extended surfaces, so that all the parts partake of each other's movements. Thus each plate will follow and yield exactly with each movement of the animal, and as the plates $c$ and $d$ rest always with their entire smooth surfaces upon the back of the horse they will cause no wounds by their pressure.

The pommel-plate $a$ on the head in order to limit its yielding is strengthened by one or more similarly-curved sheet-steel plates $e$, having a main portion and sidewardly and downwardly projecting extensions at the front, which are riveted one to the other, with or without intermediate layers $h$ of non-hydroscopic material, as shown in Fig. 4. The plates $e$ vary in size, each being smaller than the one upon which it rests. The pommel-plate $a$ may be bent or curved so as to surround a part of the strengthening-plate $e$, whereby moisture is prevented from entering between said plates.

The opening between the side plates $c\ d$ may be covered with pigskin $f$. The inner edges of said plates $c\ d$ may be arranged at only a short distance apart, as the wider portions toward the rear of said plates afford sufficient bearing-space on the horse's back to carry the weight of the rider.

I claim—

1. In a saddle tree or frame, the combination of two sheet-steel side plates having sideway and downward extensions formed integral therewith at their forward ends, said plates being arranged at a short distance apart, being comparatively narrow adjoining said extensions, and having wider portions toward their rear, where they are rounded off, a sheet-steel pommel-plate having sidewardly and downwardly projecting portions at its front fitting the extensions of the side plates, and a sheet-steel cantle-plate in the form of a crescent riveted to the side plates around its inner curve and projecting upward and backward from said side plates, substantially as herein shown and described.

2. In a saddle tree or frame, the combination of two sheet-steel side plates having sideway and downward extensions formed integral therewith at their forward ends, said plates being arranged at a short distance apart, being comparatively narrow adjoining said extensions, and having wider portions toward their rear, where they are rounded off, a sheet-steel pommel-plate having sidewardly and downwardly projecting portions at its front fitting the extensions of the side plates, a series of strengthening-plates riveted to the pommel-plate and side plates, each strengthening-plate having a main portion and sidewardly and downwardly projecting portions at its front end, and a sheet-steel cantle-plate in the form of a crescent riveted to the side plates around its inner curve and projecting upward and backward from said side plates, substantially as herein shown and described.

3. In a saddle tree or frame, the combination of two sheet-steel side plates having sideway and downward extensions formed integral therewith at their forward ends, said plates being arranged at a short distance apart, being comparatively narrow adjoining said extensions, and having wider portions toward their rear, where they are rounded off, a sheet-steel pommel-plate having sidewardly and downwardly projecting portions at its front fitting the extensions of the side plates, a series of strengthening-plates riveted to the pommel-plate and side plates, each strengthening-plate having a main portion and sidewardly and downwardly projecting portions at its front end, and being smaller than the one upon which it rests, and a sheet-steel cantle-plate in the form of a crescent riveted to the side plates around its inner curve and projecting upward and backward from said plates, substantially as herein shown and described.

In testimony whereof I have signed my name to this specification in the presence of two subscribing witnesses.

RUDOLF GUILLEAUME.

Witnesses:
  WILLIAM KUEPPERS,
  GOH. SCHULZ..